US008423480B2

(12) United States Patent
Nakajima et al.

(10) Patent No.: US 8,423,480 B2
(45) Date of Patent: Apr. 16, 2013

(54) IMAGE FORMING APPARATUS, BILLING AMOUNT DETERMINATION METHOD AND BILLING SYSTEM

(75) Inventors: Akio Nakajima, Toyokawa (JP); Kentaro Nagatani, Toyokawa (JP); Tomoko Maruyama, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 520 days.

(21) Appl. No.: 12/352,953

(22) Filed: Jan. 13, 2009

(65) Prior Publication Data
US 2009/0319443 A1    Dec. 24, 2009

(30) Foreign Application Priority Data
Jun. 20, 2008  (JP) ................. 2008-161266

(51) Int. Cl.
G06F 17/00  (2006.01)
G06G 7/00   (2006.01)
G06Q 20/00  (2012.01)

(52) U.S. Cl.
USPC .............................. 705/400; 705/16; 705/20

(58) Field of Classification Search .................. 705/400
See application file for complete search history.

(56) References Cited

U.S. PATENT DOCUMENTS

| 5,117,258 | A | * | 5/1992 | Iwata | 399/79 |
| 5,506,661 | A | * | 4/1996 | Hanzawa | 399/1 |
| 5,771,433 | A | * | 6/1998 | Kimijima | 399/369 |
| 6,477,443 | B2 | * | 11/2002 | Salgado et al. | 700/220 |
| 2002/0128953 | A1 | * | 9/2002 | Quallen et al. | 705/37 |
| 2003/0187808 | A1 | * | 10/2003 | Alfred et al. | 705/400 |
| 2005/0213719 | A1 | * | 9/2005 | Nomura et al. | 379/100.04 |
| 2009/0070243 | A1 | * | 3/2009 | Buck et al. | 705/34 |

FOREIGN PATENT DOCUMENTS

| JP | 63-060659 | 3/1988 |
| JP | 05-078058 U | 10/1993 |
| JP | 09-116652 | 5/1997 |
| JP | 2000-047540 A | 2/2000 |
| JP | 2001-293933 | 10/2001 |
| JP | 2003-274077 A | 9/2003 |

OTHER PUBLICATIONS

Notification of Reasons for Refusal dated May 11, 2010, issued in the corresponding Japanese Patent Application No. 2008-161266, and an English Translation thereof.

* cited by examiner

*Primary Examiner* — Scott Zare
(74) *Attorney, Agent, or Firm* — Buchanan Ingersoll & Rooney PC

(57) ABSTRACT

An image forming apparatus that executes a job and determines a billing amount for the job depending on a parameter value given to a parameter that relates to the execution of the job, the image forming apparatus comprising: a storage that stores therein a first table and a second table, the first table defining billing amounts for a plurality of non-overlapping value ranges in one-to-one correspondence, the second table defining billing amounts for a plurality of specific values in one-to-one correspondence; and a determiner operable to refer to the second table before referring to the first table and judge whether the parameter value is identical to any one of the plurality of specific values in the second table (step S402), and if identical (Yes in step S402), determine the billing amount for the job according to the second table (step S403).

9 Claims, 13 Drawing Sheets

FIG. 3A

| No | SIZE | BILLING AMOUNT | ACTUAL SIZE 1 | ACTUAL SIZE 2 |
|---|---|---|---|---|
| 1 | A5 | 12 | 148 | 210 |
| 2 | A4 | 14 | 210 | 297 |
| 3 | A3 | 16 | 297 | 420 |

FIG. 3B

| No | ACTUAL SIZE 1 | ACTUAL SIZE 2 | BILLING AMOUNT |
|---|---|---|---|
| 1 | 100 | 200 | 20 |
| 2 | 200 | 300 | 30 |
| 3 | 300 | 400 | 40 |

FIG. 10A

| No | DESTINATION | UNIT TIME | BILLING AMOUNT |
|---|---|---|---|
| 1 | 01-2345-6789 | 3 | 10 |
| 2 | 06-3456-7890 | 3 | 10 |
| 3 | 03-4567-8901 | 3 | 10 |

FIG. 10B

| No | DESTINATION | UNIT TIME | BILLING AMOUNT |
|---|---|---|---|
| 1 | [1-9] | 3 | 10 |
| 2 | 03[1-9] | 1 | 50 |
| 3 | 052[1-9] | 1 | 30 |
| 4 | 06[1-9] | 1 | 50 |
| 5 | 050 | 3 | 10 |
| 6 | 0[8-9]0 | 1 | 100 |
| 7 | 05[9,6] | 1 | 40 |

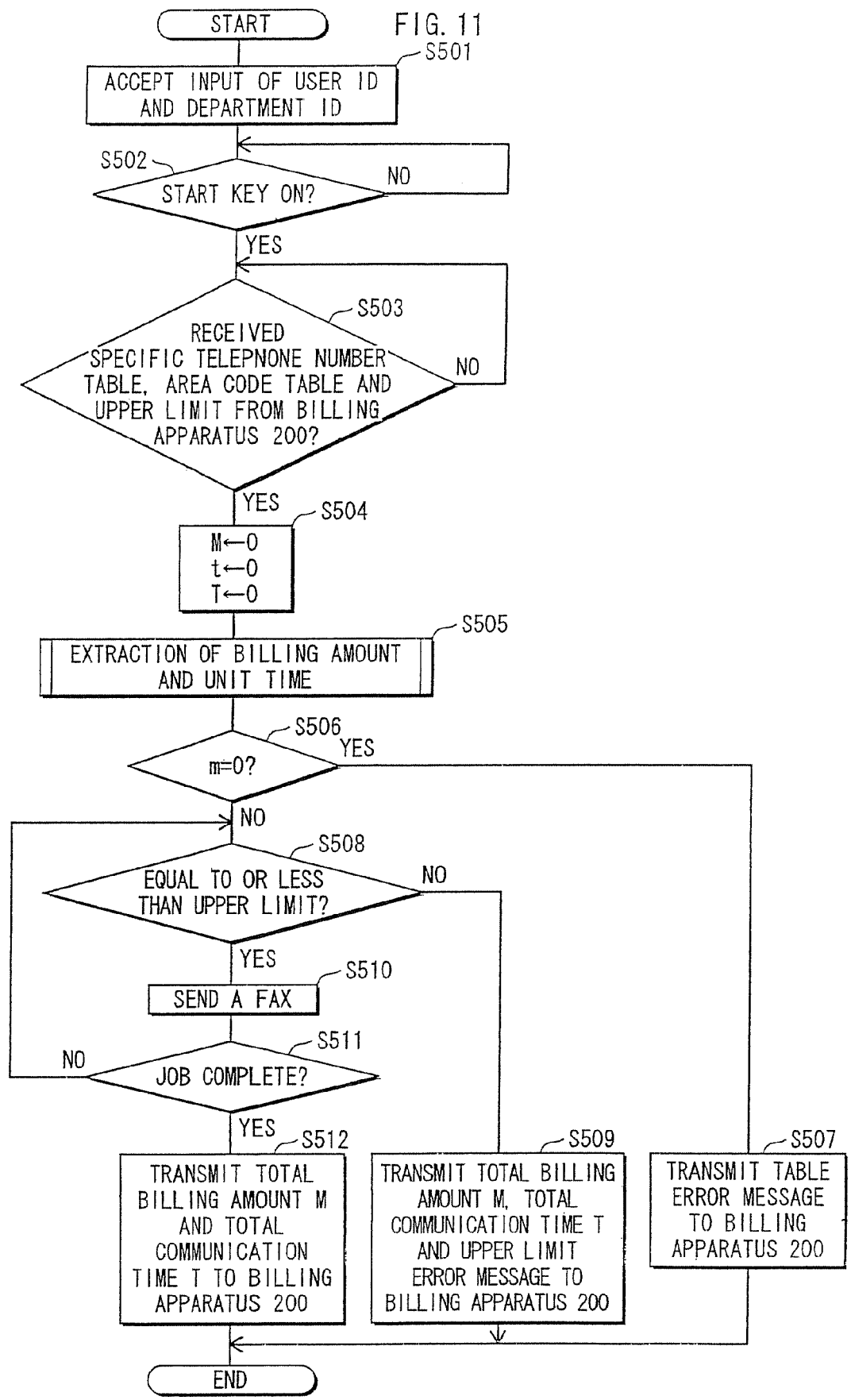

IMAGE FORMING APPARATUS, BILLING AMOUNT DETERMINATION METHOD AND BILLING SYSTEM

This application is based on application No. 2008-161266 filed in Japan, the contents of which are hereby incorporated by reference.

BACKGROUND OF THE INVENTION (1) Field of the Invention

The present invention relates to an image forming apparatus, such as an MFP (Multi functional Peripheral) that has functions of copying, faxing, printing or the like. More particularly, the present invention relates to a technique to efficiently determine a billing amount for a job.

(2) Description of the Related Art

Conventionally, billing operation of an image forming apparatus is performed in such a way that the image forming apparatus downloads and refers to a billing amount table generated by a billing apparatus based on an input by a user.

The billing amount table is a database in which billing amounts are associated with sheet sizes. Upon executing a job, such as copying and printing, the image forming apparatus refers to the billing amount table, and determines a billing amount regarding the job. With this structure, it is possible to charge a fee according to the sheet sizes.

The conventional billing amount tables, however, list the billing amounts in one-to-one association with the sheet sizes. Therefore, the table size increases as the number of available sheet sizes increases. As a result, in the image forming apparatus, the amount of memory to store therein the billing amount table becomes large, and it takes a long time to determine the applicable billing amount based on the billing amount table. Furthermore, downloading of the billing amount table also takes a long time.

The above only describes the billing according to the sheet sizes. When a facsimile function is used, however, it is also conceivable to charge a fee according to telephone numbers. The same problems arise in this case as well.

SUMMARY OF THE INVENTION

The object of the present invention is to provide an image forming apparatus whose amount of memory is reduced and that is capable of determining a billing amount efficiently.

The object is achieved by an image forming apparatus that executes a job and determines a billing amount for the job depending on a parameter value given to a parameter that relates to the execution of the job, the image forming apparatus comprising: a storage that stores therein a first table and a second table, the first table defining billing amounts for a plurality of non-overlapping value ranges in one-to-one correspondence, the second table defining billing amounts for a plurality of specific values in one-to-one correspondence, and at least one of the plurality of specific values being included in any of the plurality of value ranges; and a determiner operable to refer to the second table and judge whether the parameter value given to the parameter is identical to any one of the plurality of specific values in the second table, and if identical, determine the billing amount for the job according to the second table, without judging whether the parameter value is included in any of the plurality of value ranges in the first table.

Note that the parameter is a sheet size or a telephone number, for example.

The second table that defines billing amounts for the specific values in one-to-one correspondence is smaller in size than the conventional table that define billing amounts for all the values that might be used. Particularly, if the parameter value given to the parameter relating to the job is identical to any of the specific values in the second table, it is possible to save time for determining the billing amount for the job.

Also, the first table defines billing amounts for the value ranges in one-to-one correspondence, and the second table defines billing amounts for the specific values in one-to-one correspondence. These two tables require a smaller amount of memory in total than the conventional table. Accordingly, the amount of memory of the image forming apparatus can be reduced, and the first and second tables can be downloaded in a shorter time period.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 3A shows a data structure of a size table;

FIG. 3B shows a data structure of a range table;

FIG. 10A shows a data structure of a specific telephone number table;

FIG. 10B shows a data structure of an area code table;

FIG. 11 is a flowchart showing generation of billing information for a facsimile job;

DESCRIPTION OF THE PREFERRED EMBODIMENTS

Embodiment 1

1. Overall Structure

Figure 1:
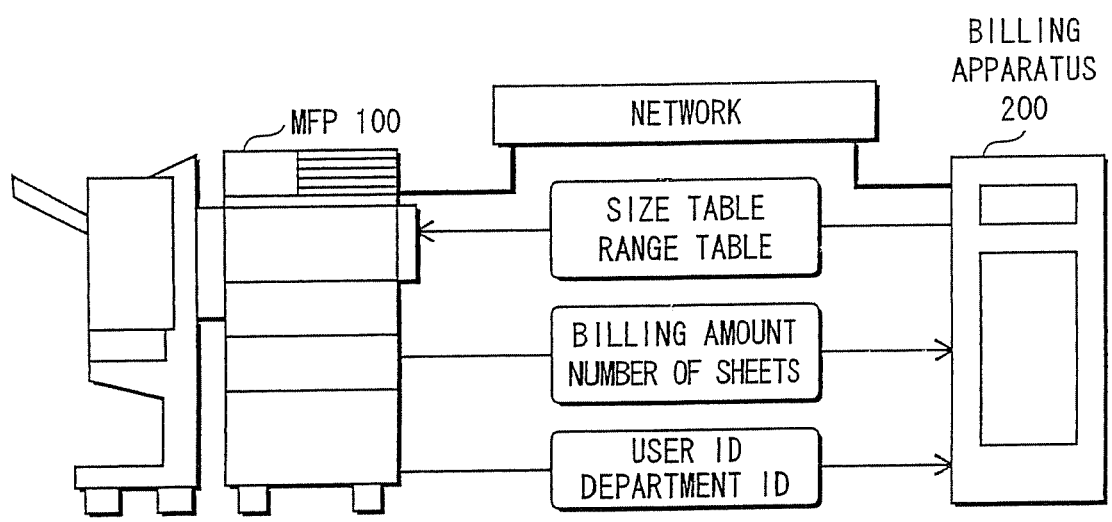
FIG. 1 shows a billing system.

FIG. 1 shows a billing system in which an MFP (Multi Functional Peripheral) 100 is used as an example of the image forming apparatus of the present invention. The MFP 100 is connected to a billing apparatus 200 via a network.

The MFP 100 accepts user IDs and department IDs inputted by users. By transmitting the accepted user IDs and department IDs to the billing apparatus 200, the MFP 100 downloads, from the billing apparatus 200, two kinds of billing amount tables (namely, a size table and a range table) and an upper limit of billing that correspond to each of the transmitted user IDs and department IDs.

The MFP 100 also executes jobs, such as copying, printing, scanning and faxing, within the upper limit of billing, generates billing information regarding the jobs executed based on the billing amount tables, and transmits the generated billing information to the billing apparatus 200.

Specifically, the billing apparatus 200 is a personal computer or the like that functions as a billing apparatus by loading a program. The billing apparatus 200 generates, based on the input by a user, the size tables and the range tables, and establishes the upper limits of billing. The size table lists the billing amounts in one-to-one association with the sheet sizes, and the range table lists the billing amounts in one-to-one association with the ranges of the sheet length. The billing apparatus 200 stores therein the generated size tables and range tables and the established upper limits of billing in association with the user IDs and the department IDs.

Also, the billing apparatus 200 chooses the size table, the range table and the upper limit of billing that correspond to the user ID and the department ID transmitted from the MFP 100, and transmits back the chosen billing amount tables and upper limit to the MFP 100.

Furthermore, the billing apparatus 200 performs billing management of jobs for each user ID and department ID, based on the billing information transmitted from the MFP 100.

2. Structure of Billing Apparatus

Figure 2:
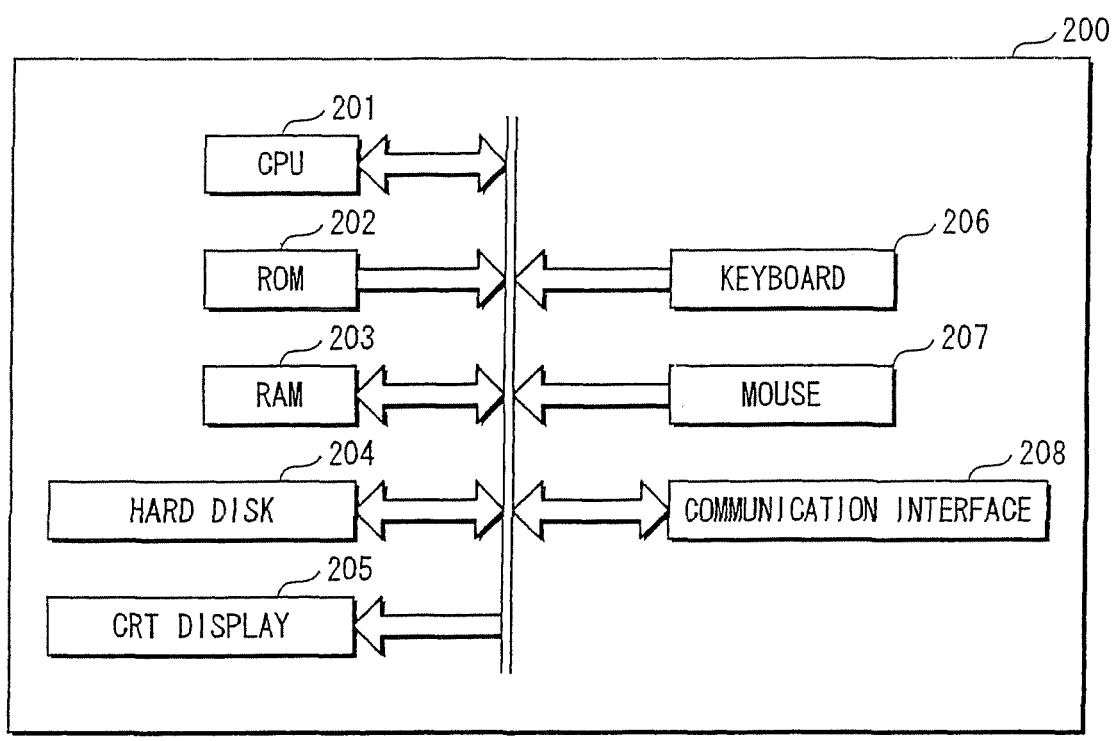
FIG. 2 is a block diagram showing a structure of a billing apparatus 200.

FIG. 2 is a block diagram showing the structure of the billing apparatus 200. The billing apparatus 200 is structured so as to include a CPU 201, a ROM 202, a RAM 203, a hard disk 204, a CRT display 205, a keyboard 206, a mouse 207 and a communication interface 208. These components are connected with each other via a bus such that communication can be carried out among them.

The hard disk 204 stores therein, in addition to an OS, a control program relating to the generation of the billing amount tables, application software that communicates with the MFP 100 in order to receive the billing information and output the billing amount tables etc. to/from the MFP 100, and programs such as a browser. In addition, the hard disk 204 stores therein the size tables, the range tables and the upper limits of billing in one-to-one association with the user IDs and the department IDs. When the billing apparatus 200 is powered on, the OS is started up and a program is read out on the RAM 203 based on the instruction from the keyboard 206 or the mouse 207, and the CPU executes the program.

The CRT display 205 displays input screens from which an input operation is performed for generating the billing amount tables, namely, the size table and the range table. A user inputs desired numbers in the input screen from the keyboard 206 or the mouse 207 to generate each of the billing amount tables.

The communication interface 208 is connected with the network, and performs operations such as receiving the billing information from the MFP 100 and outputting, to the MFP 100, the billing amount tables and the upper limit of billing stored in the hard disk 204 in the billing apparatus 200.

3. Billing Amount Table 3.1. Data Structure of Billing Amount Table

FIGS. 3A and 3B show the data structures of the billing amount tables, that is to say, the size table and the range table. FIG. 3A shows the size table, and FIG. 3B shows the range table. The size table lists the billing amounts for specific sheet sizes that are selected from among the standard and non-standard sizes. As shown in FIG. 3A, the size table is composed of columns of a row number, a size, a billing amount, an actual size 1 and an actual size 2. Here, as the specific sheet sizes, the size table lists the standard sheet sizes of A5, A4 and A3. The actual sizes 1 and 2 respectively show the short-side length and the long-side length of each standard sheet size.

The range table lists the billing amounts in one-to-one association with the ranges of the sheet length. As shown in FIG. 3B, the range table is composed of columns of a row number, an actual size 1, an actual size 2 and a billing amount. The actual size 1 and 2 respectively show the short-side length and the long-side length for each range. In this example, the row No. 1 indicates that the billing amount of 20 yen is applied to a sheet of paper whose short side length is up to 100 (mm) and long side length is up to 200 (mm).

As described above, by generating the size table (for the sizes of A5, A4 and A3) in addition to the range table, it is possible to properly set the billing amounts. In particular, the above structure is effective in the case where it is desired to apply the different billing amounts to the specific sheet sizes separately from the billing amounts listed in the range table. For example, in the environment where a large number of A4 sheets are used, and therefore A4 sheets are purchased at a discount price, it is possible to set the lower billing amount for the A4 sheets in the size table than the billing amount for the length range including the A4 size in the range table. By applying the lower billing amount to the A4 sheets in the size table, the proper billing can be performed according to the environment.

The following describes how the billing amount tables shown in FIGS. 3A and 3B are generated.

3.2. Generation of Billing Amount Table 3.2.1. Generation of Size Table

Figure 4:
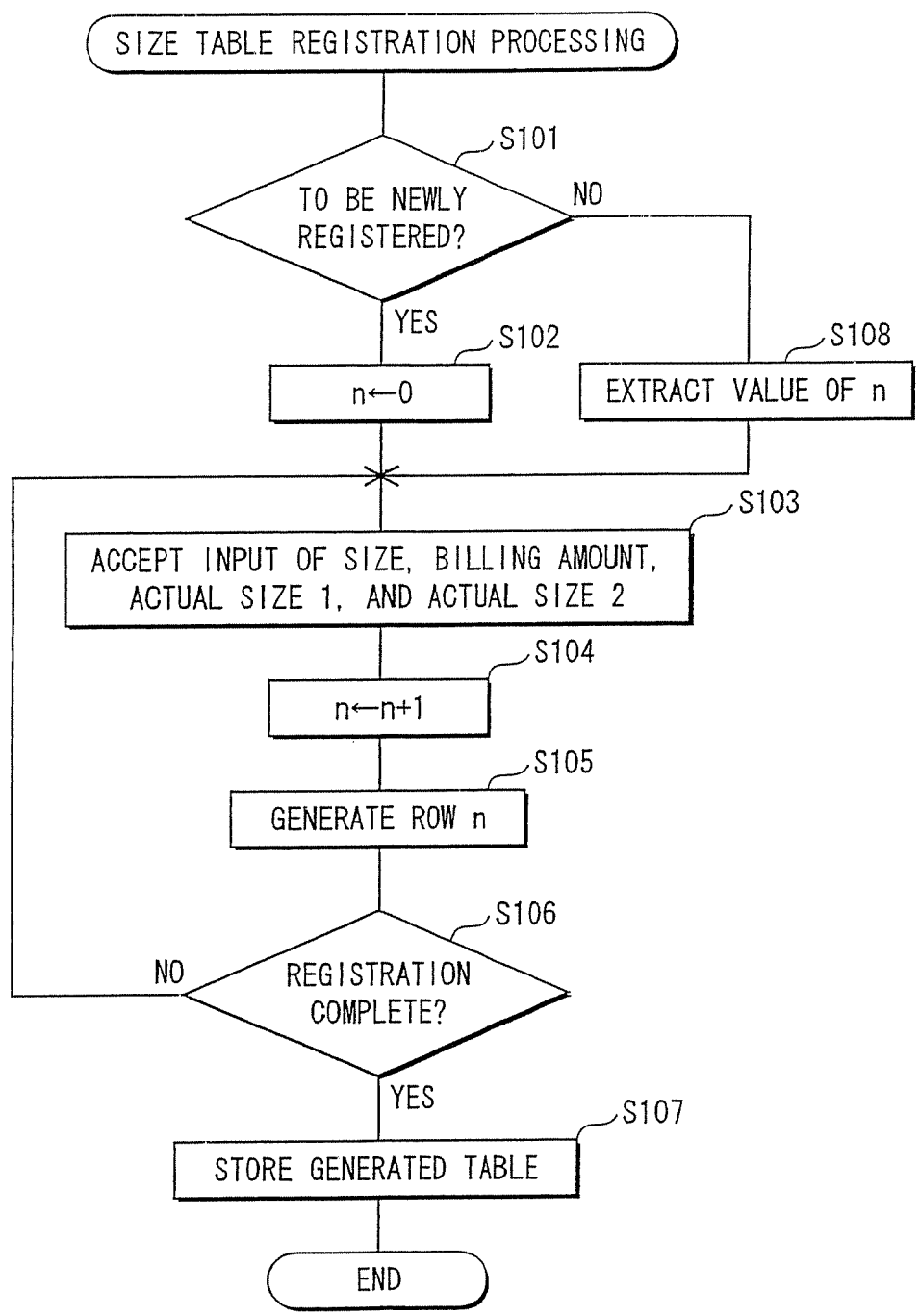
FIG. 4 is a flowchart showing a size table registration processing.

FIG. 4 is a flowchart showing registration processing of the size table. In the flowchart, an "n" is a variable representing the row number in the size table, and is stored in a particular register.

Firstly, the billing apparatus 200 judges whether the size table is to be registered newly or not (step S101). If the size table is to be registered newly (Yes in step S101), the billing apparatus 200 initializes the variable n (step S102).

Then the billing apparatus 200 accepts an input, by a user, of the size, the billing amount, the actual size 1 and the actual size 2 (step S103), and the billing apparatus 200 increments the variable n by one (step S104). Subsequently, based on the input by the user, the billing apparatus 200 generates the row indicated by the variable n (step S105).

After generating the row n, the billing apparatus 200 judges whether the registration has been completed or not (step S106). This judgment is made by confirming whether or not the billing apparatus 200 has accepted the input, by the user, of 0, 0, 0, 0 as the values of the size, the billing amount, the actual size 1 and the actual size 2.

If the registration has not been completed (No in step S106), the processing returns to the step S103.

If the registration has been completed (Yes in step S106), the billing apparatus 200 stores therein the generated size table (step S107).

On the contrary, in the case where the table has already been registered in the step S101 and a new row is to be added to the table (No in step S101), the billing apparatus 200 extracts a value of the variable n stored in the particular register (step S108).

After extracting the value of the variable n, the processing moves forward to the step S103.

3.2.2. Generation of Range Table

Figure 5:
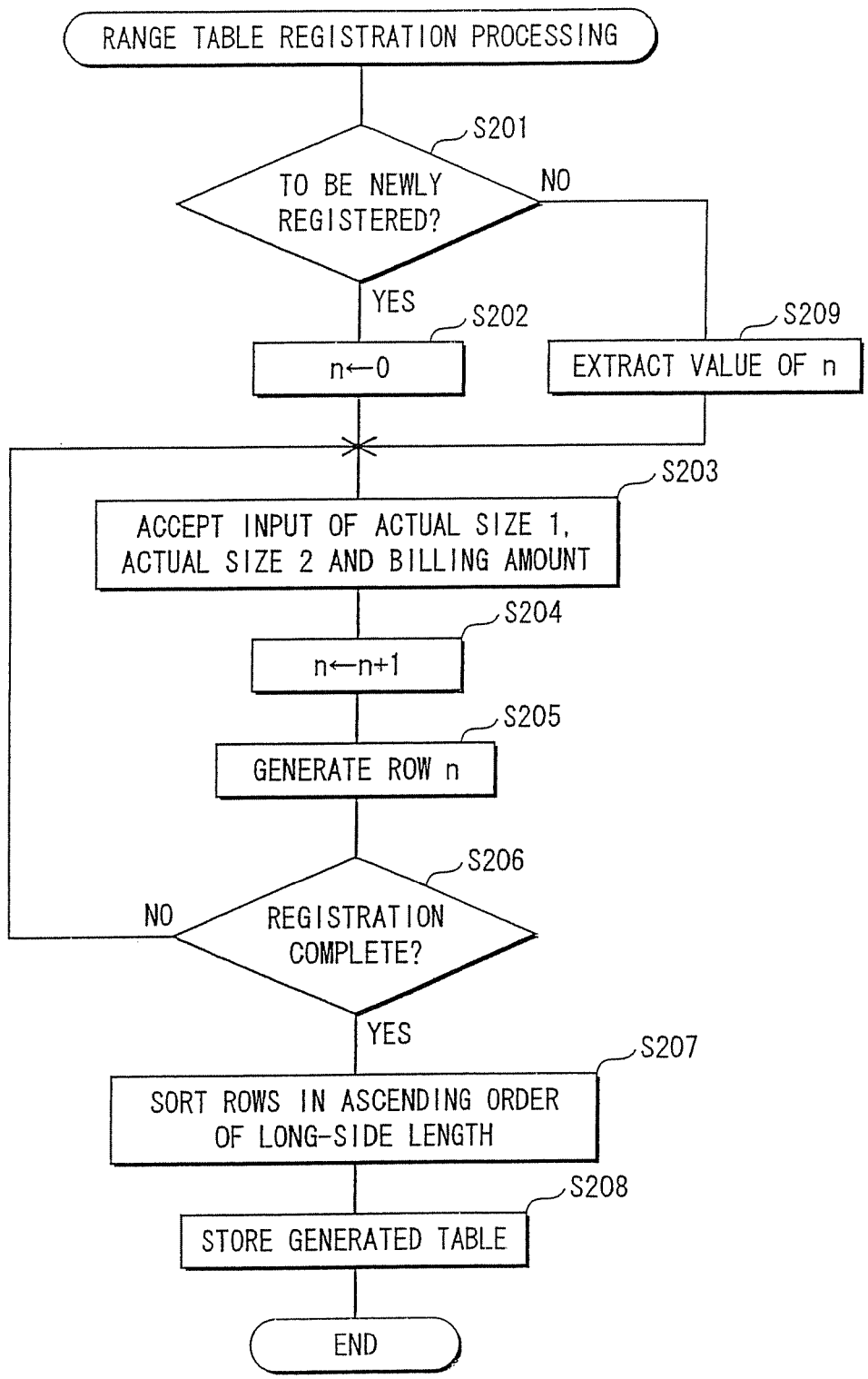
FIG. 5 is a flowchart showing a range table registration processing.

FIG. 5 is a flowchart showing registration processing of the range table. In the flowchart, an "n" is a variable representing the row number in the range table, and is stored in a particular register.

Firstly, the billing apparatus 200 judges whether a range table is to be registered newly or not (step S201). If the range table is to be registered newly (Yes in step S201), the billing apparatus 200 initializes the variable n (step S202).

Then the billing apparatus 200 accepts an input, by the user, of the actual size 1, the actual size 2 and the billing amount (step S203), and the billing apparatus 200 increments the variable n by one (step S204). Subsequently, based on the input by the user, the billing apparatus 200 generates a row indicated by the variable n (step S205).

After generating the row n, the billing apparatus judges whether the registration has been completed or not (step S206). This judgment is made by confirming whether or not the billing apparatus 200 has accepted the input, by the user, of 0, 0, 0 as the values of the actual size 1, the actual size 2 and the billing amount.

If the registration has not been completed (No in step S206), the processing returns to the step S203.

If the registration has been completed (Yes in step S206), the billing apparatus 200 sorts the rows in the generated range table into an ascending order of the long side length (step S207). Then the billing apparatus 200 stores therein the sorted table (step S208).

On the contrary, in the case where the table has already been registered in the step S201, and a new row is to be added, (No in step S201), the billing apparatus 200 extracts a value of the variable n stored in the particular register (step S209).

After extracting the value of the variable n, the processing moves forward to the step S203.

Next, the structure of the MFP 100 is described.

4. Structure of MFP 4.1. Hardware Structure

Figure 6:
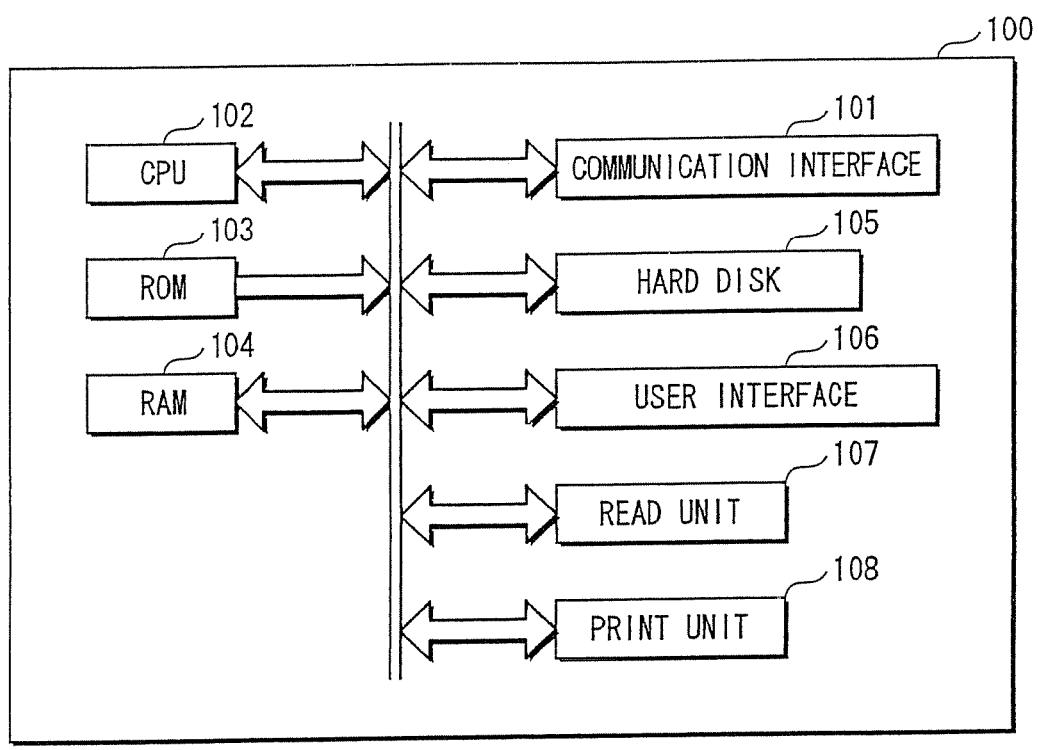
FIG. 6 shows a hardware structure of an MFP 100.

FIG. 6 shows a hardware structure of the MFP 100. As shown in the FIG. 6, the MFP 100 is structured so as to include a communication interface 101, a CPU 102, a ROM 103, a RAM 104, a hard disk 105, a user interface 106, a read unit 107, a print unit 108, and so on. These components are connected with each other via a bus such that communication can be carried out among them.

The communication interface 101 is connected to a network, and transmits the user IDs, the department IDs and the billing information to the billing apparatus 200, and receives the billing amount tables from the billing apparatus 200.

The ROM 103 stores therein a control programs etc. relating to the generation of the billing information for the jobs.

The RAM 104 is used as a work area of the CPU 102.

The hard disk 105 stores therein the billing amount tables and the upper limits of billing downloaded from the billing apparatus 200. If the connection to the billing apparatus 200 has any trouble, the billing information for each user ID and department ID is stored in the hard disk 105.

Upon receiving the request of the jobs such as copying, printing, scanning and faxing, the CPU 102 reads a necessary program from the ROM 103, and controls the execution of the jobs requested.

Also, the CPU 102 refers to the size table or the range table, and generates the billing information for the job that has been executed.

The user interface 106 has an input unit and a display unit. The user inputs the conditions of job execution or information such as destination from the input unit, and the display unit displays information.

The read unit 107 reads images.

The print unit 108 prints images.

4.2. Functional Structure

Figure 7:
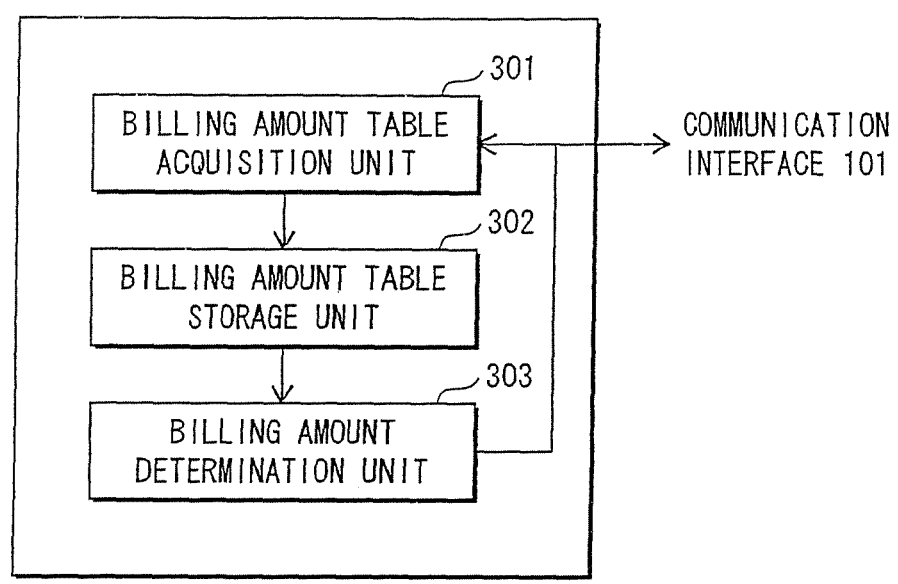
FIG. 7 is a block diagram showing a functional structure of the MFP 100.

The following describes the function to be achieved by the CPU operating in accordance with the control program stored in the ROM 103. FIG. 7 is a block diagram showing the functional structure of the MFP 100. As shown in FIG. 7, the MFP 100 is structured so as to include a billing amount table acquisition unit 301, a billing amount table storage unit 302 and a billing amount determination unit 303.

The billing amount table acquisition unit 301 acquires the size table and the range table as the billing amount tables from the billing apparatus 200 via the communication interface 101, and outputs the acquired size table and range table to the billing amount table storage unit 302.

The billing amount table storage unit 302 stores therein the size table and the range table received from the billing amount table acquisition unit 301.

The billing amount determination unit 303 refers to either the size table or the range table stored in the billing amount table storage unit 302, determines the billing amount for a current job and transmits the determined billing amount to the billing apparatus 200 via the communication interface 101.

To be more precise, firstly the billing amount determination unit 303 judges whether a sheet size of the current job is listed in the size table or not. If judging that the sheet size of the current job is listed in the size table, the billing amount determination unit 303 determines the billing amount based on the size table. Meanwhile if judging that the sheet size of the current job is not included in the size table, the billing amount determination unit 303 further judges whether the sheet size of the current job is included in any of the ranges listed in the range table. If judging that the sheet size of the current job is included in any of the ranges listed in the range table, the billing amount determination unit 303 determines the billing amount based on the range table. On the contrary if judging that the size of the current job is not listed in any of the tables, the billing amount determination unit 303 transmits an error message to the billing apparatus 200.

5. Operations of MFP 5.1. Main Routine

Figure 8:
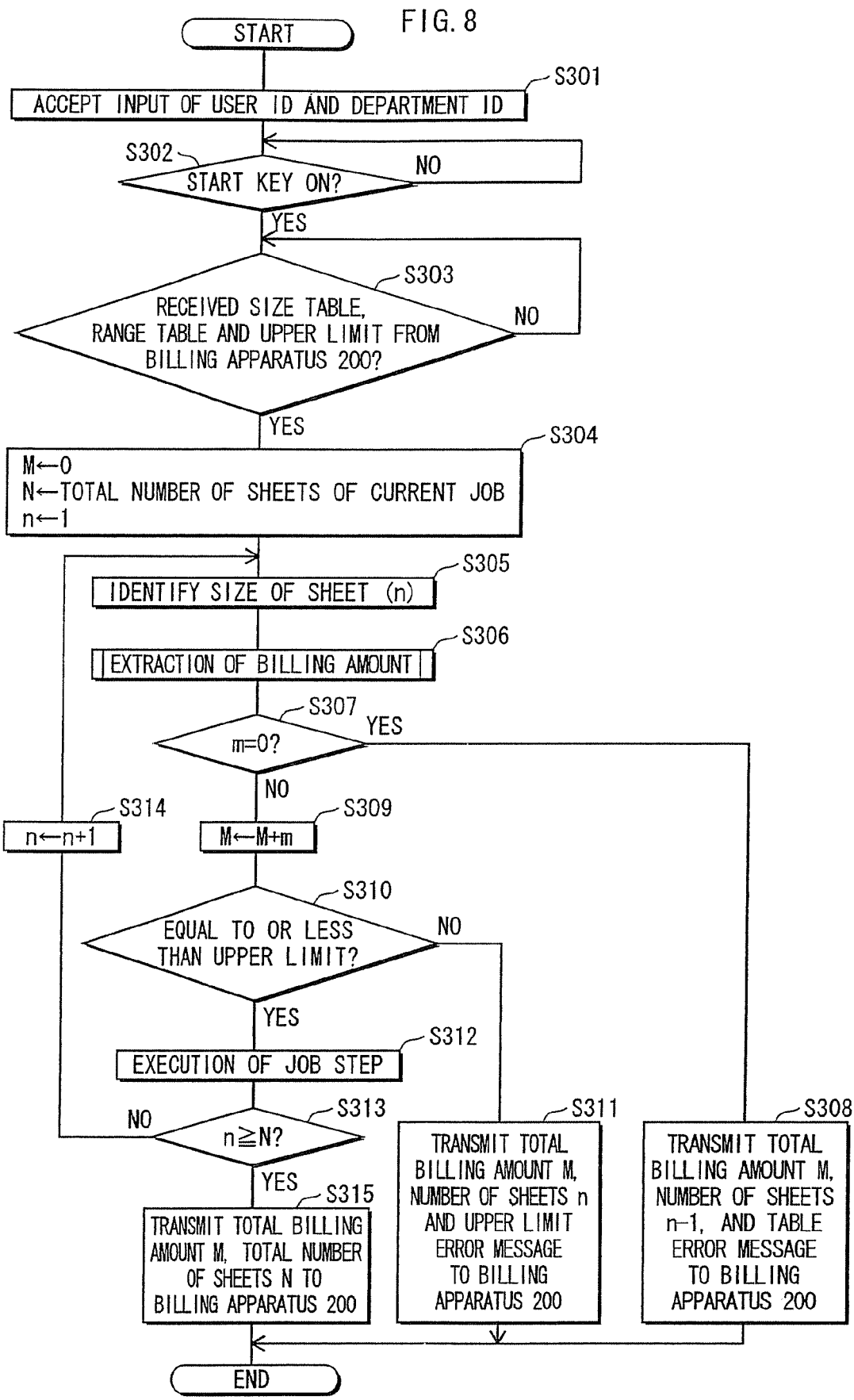
FIG. 8 is a flowchart showing generation of billing information for a job.

The following describes the operations of the MFP 100. FIG. 8 is a flowchart showing the generation of billing information for a job that consists of one or more job steps. In this flowchart, a letter "M" represents a total billing amount for the job. A letter "N" represents the total number of sheets of the job. A letter "m" represents a billing amount for a currently-processed sheet, and a letter "n" represents the number of sheets counted from the start to the currently-processed sheet.

Firstly, the MFP 100 accepts the user ID and the department ID inputted by a user (step S301). When a start key is pressed by a user (YES in step S302), the MFP 100 transmits the accepted user ID and department ID to the billing apparatus 200.

The MFP 100 judges whether the MFP 100 has received, from the billing apparatus 200, the size table, the range table and the upper limit corresponding to the transmitted user ID and department ID (step S303). Receiving the size table, the range table and the upper limit (YES in step S303), the MFP 100 initializes the total billing amount M and the number of sheets counted n, and assigns the total number of sheets of the job to the N (step S304).

The MFP 100 identifies the size of the n-th sheet (step S305), and extracts the applicable billing amount (step S306). Extraction of the billing amount is to be described below.

The MFP 100 judges whether the billing amount m extracted is 0 or not (step S307). If judging affirmatively, that is, if the billing amount m is 0 and no billing amount was extracted from any of the tables (YES in step S307), the MFP 100 transmits, to the billing apparatus 200, the billing information that includes the total billing amount M and the number of sheets counted n-1 for the job steps that have been carried out so far, and a table error message (step S308).

If judging negatively, that is, if the billing amount m is not 0 and the billing amount was extracted from one of the tables (No in step S307), the extracted m is added to the total billing amount M (step S309), and subsequently the MFP 100 judges whether the total billing amount M as the result of the addition is equal to or less than the received upper limit or not (step S310).

If the total billing amount M is more than the upper limit (NO in step S310), the MFP 100 transmits, to the billing apparatus 200, the billing information that includes the total billing amount M and the number of sheets counted n for the job steps that have been carried out so far and an upper limit error message (step S311).

If the total billing amount M is equal to or less than the upper limit (YES in step S310), the MFP 100 carries out the job step (step S312), and then judges whether or not the number of sheets counted so far n is equal to or more than the N representing the total number of sheets of the job (step S313).

If the number of sheets counted so far n is less than the N representing the total number of sheets of the job (No in step S313), the variable n is incremented by one (step S314), and the processing returns to the step S305.

If the number of sheets counted so far n is equal to or more than the N (YES in step S313), the MFP 100 transmits, to the billing apparatus 200, the billing information that includes the total billing amount M and the total number of sheets N for the job that has been carried out (step S315).

5.2. Billing Amount Extraction

Figure 9:
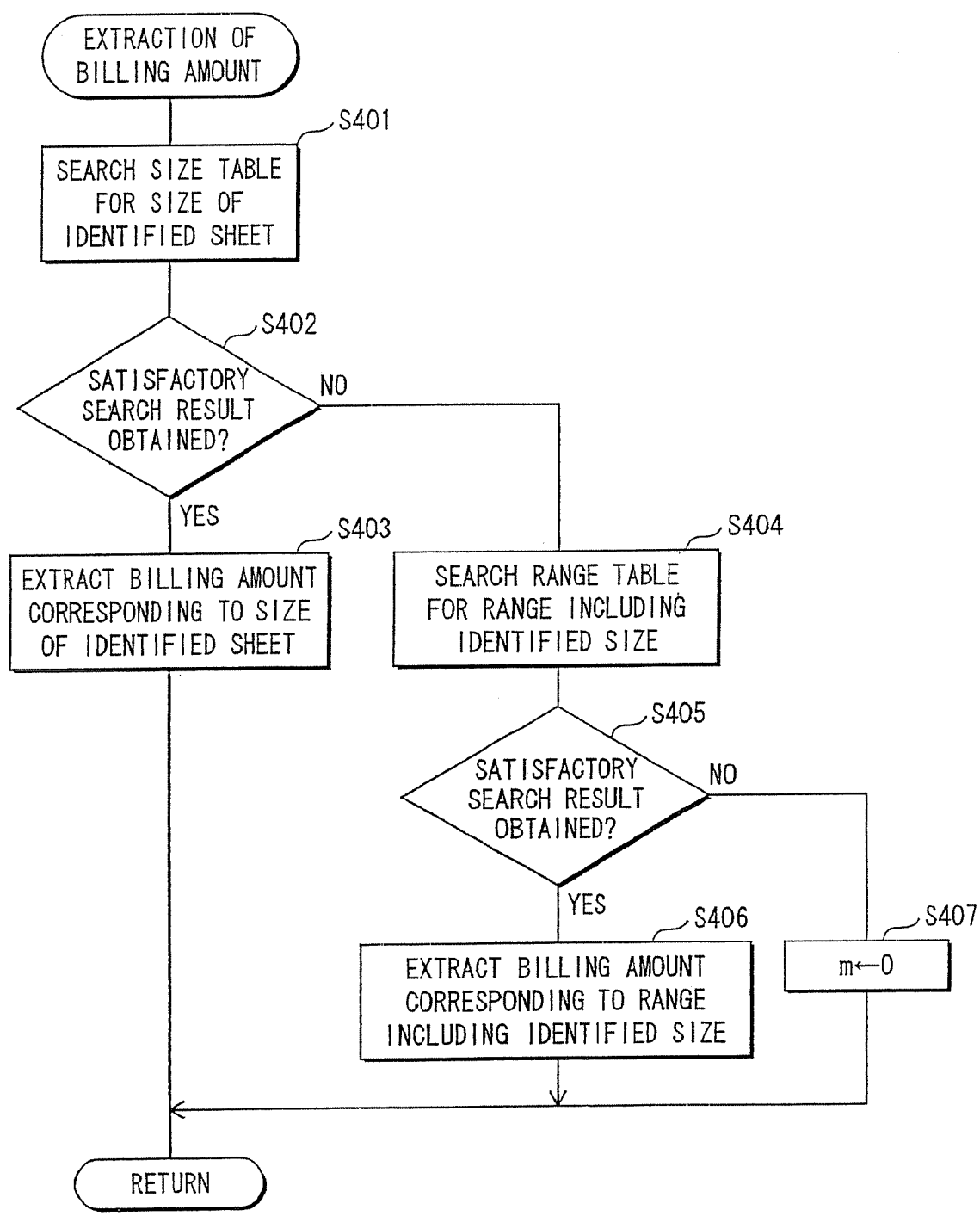
FIG. 9 is a flowchart showing billing amount extraction.

The following describes the billing amount extraction. FIG. 9 is a flowchart showing a process of the billing amount extraction. A letter "m" in this flow chart represents a billing amount for a currently-processed sheet.

Firstly, the MFP 100 searches the size table for the size of the currently-processed sheet (step S401). The MFP 100 judges whether a satisfactory search result is obtained (step S402) or not. If the satisfactory result is obtained, that is, if the size of the currently-processed sheet is listed in the size table (YES in step S402), the MFP 100 extracts the billing amount corresponding to the size of the currently-processed sheet from the size table (step S403).

If the satisfactory result is not obtained, that is, if the size of the currently-processed sheet is not listed in the size table (No in step S402), the MFP 100 further searches the range table for a range that includes the size of the currently-processed sheet (step S404). MFP 100 judges whether the satisfactory search result is obtained or not (step S405). If the satisfactory result is obtained, that is, if the range table lists the range that includes the size of the currently-processed sheet (YES in step S405), the MFP 100 extracts the billing amount corresponding to the range including the size of the currently-processed sheet from the range table (step S406).

If the satisfactory search result is not obtained, that is, if none of the size table and the range table includes the size of the currently-processed sheet (No in step S405), 0 is assigned to the billing amount m.

As described above, according to the embodiment 1, the MFP 100 stores therein the range table and the size table. The range table lists the billing amount for each of the length ranges, and the size table lists the billing amount for each of the specific sizes. Because of this structure, it is possible to reduce the amount of memory in the MFP 100 and to save time to download the billing amount tables from the billing apparatus 200, compared to the case where the stored size table lists all the billing amounts in one-to-one correspondence to the standard and non-standard paper sizes that might be used.

Also, even if the size of the currently-processed sheet is not listed in the size table, the MFP 100 determines the billing amount based on the rage table, if the aforementioned sheet size is included in one of the ranges listed in the range table. With this structure, it is possible to perform the billing properly.

Furthermore, the billing amount is efficiently determined by referring to the size table first then to the range table next.

Note that the efficiency is further enhanced if the size table lists only the sheet sizes that are frequently used.

Embodiment 2

The embodiment 1 describes the billing depending on the sheet sizes. Meanwhile, the billing may be performed depending on the telephone numbers when the MFP 100 sends faxes. Specifically, the MFP 100 downloads, from the billing apparatus 200, an area code table and a specific telephone number table, and generates the billing information based on these tables. In particular, it is conceivable that various telephone numbers are used to send faxes, and therefore it is very effective to store the two tables, namely, the area code table and the specific telephone number table.

6. Billing Amount Table

FIGS. 10A and 10B show the data structures of the billing amount tables. FIG. 10A shows the data structure of the specific telephone number table, and FIG. 10B shows that of the area code table.

The specific telephone number table lists the billing amount for each of the specific telephone numbers, and is composed of columns of a row number, a destination, a unit time and a billing amount, as shown in FIG. 10A. Here, as the specific telephone numbers, <01-2345-6789>, <06-3456-7890> and <03-4567-8901> are listed.

The area code table lists the billing amount for each of the area codes, and is composed of columns of a row number, a destination, a unit time and a billing amount as shown in FIG. 10B. Here, a bracket "[ ]" in the area code table indicates the numbers to which the corresponding billing amount is to be applied. A sign "–" shows a range of numbers to which the corresponding billing amount is to be applied. A sign "," shows that the corresponding billing amount is to be applied to the numbers delimited by the comma.

As described above, by generating the specific telephone number table (<01-2345-6789>, <06-3456-7890> and <03-4567-8901>) in addition to the area code table, it is possible to perform the billing properly, in the same way as the billing based on the sheet sizes. In particular, this structure is effective in the case where it is desired to apply, to the specific telephone numbers, the billing amounts different from those listed in the area code table.

7. Operations of MFP 100 When Sending a Fax 7.1. Main Routine

The following describes the operations of the MFP 100 when sending a fax. FIG. 11 is a flowchart showing the generation of billing information for a faxing job. In this flowchart a letter "M" represents a total billing amount for the job. A letter "T" represents a total communication time of the job. A letter "m" and a letter "JT" respectively represent a billing amount and a unit time corresponding to a telephone number as the destination of the job. A letter "t" represents a communication time by which the MFP 100 judges whether the communication time of the job has reached the unit time or not.

Firstly, the MFP 100 accepts the user ID and the department ID inputted by a user (step S501). When the user presses a start key (Yes in step S502), the MFP 100 transmits the accepted user ID and department ID to the billing apparatus 200.

Then the MFP 100 judges whether the MFP 100 has received, from the billing apparatus 200, the specific telephone number table, the area code table, and the upper limit that correspond to the inputted user ID and department ID (step S503). Receiving the specific telephone number table, the area code table and the upper limit (YES in step S503), the MFP 100 initializes the total billing amount M, the total communication time T and the communication time t (step S504).

Then the MFP 100 performs extraction of the billing amount and the unit time (step S505) which is to be further described below, and judges whether the extracted m is 0 or not (step S506).

If it judged affirmatively, that is, if the m is 0 and no billing amount is extracted from any of the tables (YES in step S506), the MFP 100 transmits a table error message to the billing apparatus 200 (step S507).

If it judged negatively, that is, if the m is not 0 and the billing amount is extracted from one of the tables (No in step S506), the MFP 100 further judges whether or not the total billing amount M calculated by a timer interrupt processing is equal to or less than the upper limit (step S508). The timer interrupt processing is to be described below.

If the total billing amount M is more than the upper limit (No in step S508), the MFP 100 transmits, to the billing apparatus 200, the billing information that includes the total billing amount M and the total communication time T for the job and an upper limit error message, (step S509).

If the total billing amount M is equal to or less than the upper limit (YES in step S508), the MFP 100 sends a fax.

Then the MFP 100 judges whether the job has been completed or not (step S511), and if not completed (No in step S511), the processing returns the step S508. If completed (YES in step S511), the MFP 100 transmits the billing information that includes the total billing amount M and the total communication time T for the job performed, to the billing apparatus 200 (step S512).

7.2. Timer Interrupt Processing

Figure 12:
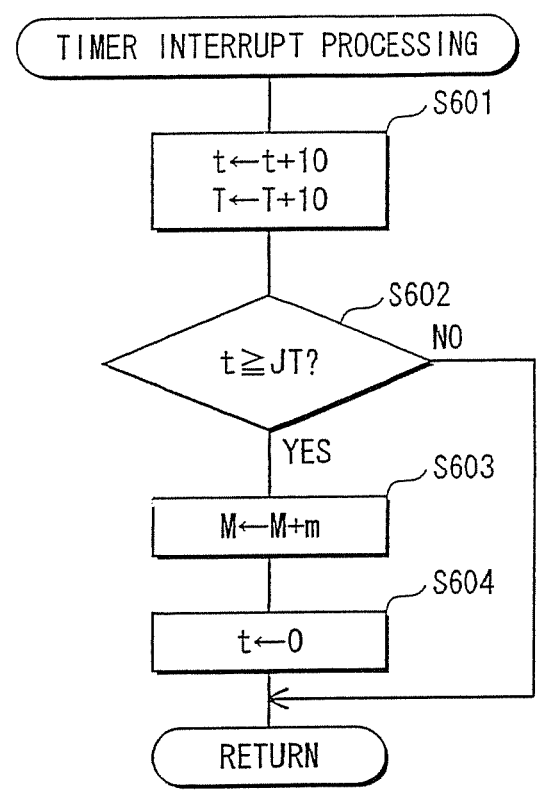
FIG. 12 is a flowchart showing timer interrupt processing.

The following describes the timer interrupt processing. FIG. 12 is a flowchart showing the timer interrupt processing. In this flowchart, a letter "M" represents a total billing amount for the job. A letter "T" represents a total communication time of the job. A letter "m" and a letter "JT" respectively represent a billing amount and a unit time corresponding to a telephone number as the destination of the job. A letter "t" represents a communication time by which the MFP 100 judges whether the communication time of the job has reached the unit time or not. Note that the timer interrupt processing is performed once in ten seconds.

Firstly, the MFP 100 increments each of the communication time t and the total communication time T by ten (step S601), and the MFP 100 judges whether the communication time t has reached the unit time JT or not (step S602).

If the communication time t has not reached the unit time JT (No in step S602), the timer interrupt processing ends. If the communication time t has reached the unit time JT (YES in step S602), the extracted m is added to the total billing amount M (step S603), and the communication time t is initialized (step S604).

7.3. Extraction of Billing Amount and Unit Time

Figure 13:
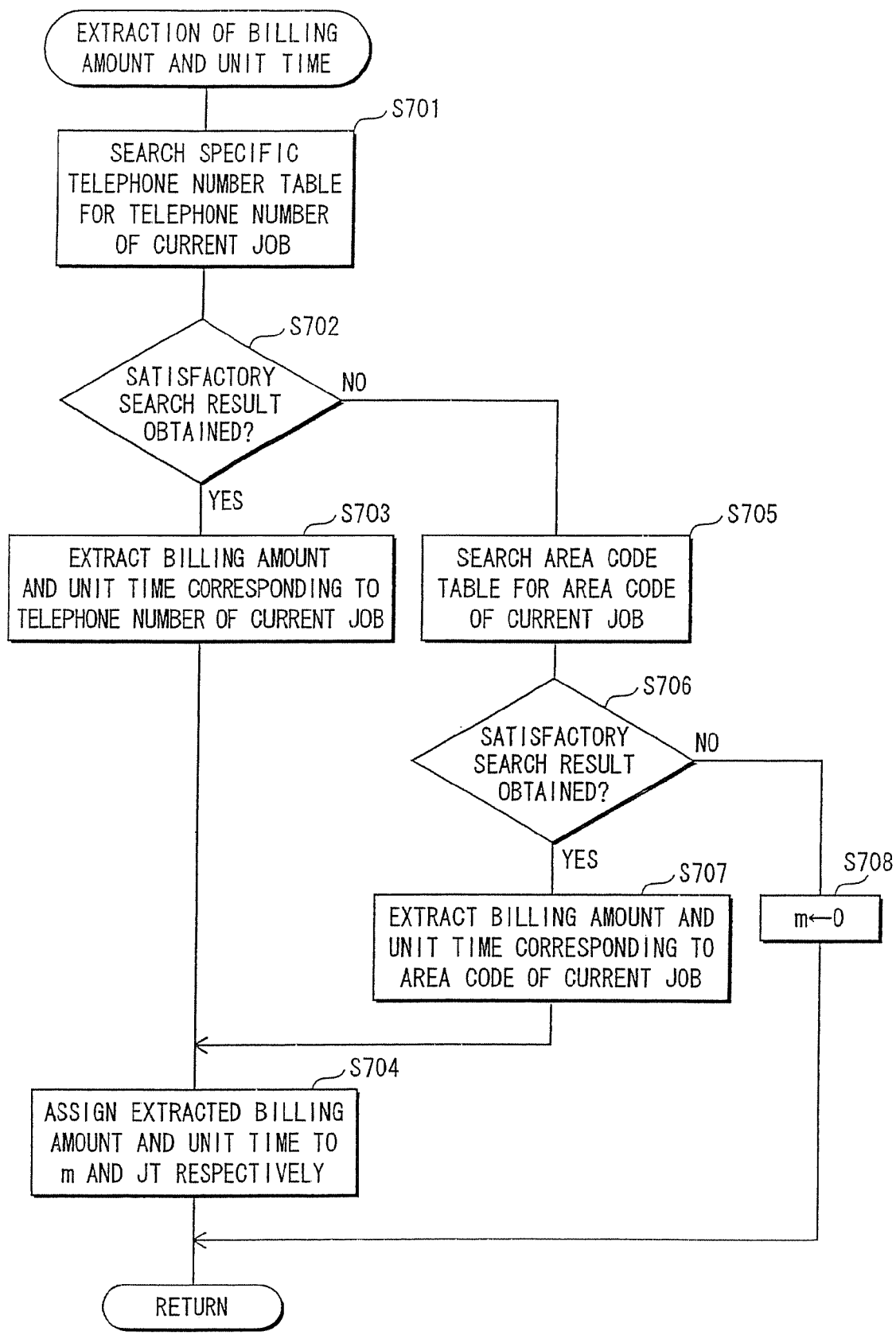
FIG. 13 is a flowchart showing extraction of a billing amount and a unit time.

The following describes the extraction of the billing amount and the unit time. FIG. 13 is a flowchart showing an operation to extract the billing amount and the unit time. In this flowchart, a letter "m" represents the billing amount that corresponds to a telephone number as a destination of a job to be executed.

Firstly, the MFP 100 searches the specific telephone number table for a telephone number of the current job (step S701).

The MFP 100 judges whether the satisfactory search result is obtained or not (step S702), and if obtained, that is, if the telephone number of the current job is included in the specific telephone number table (YES in step S702), the MFP 100 extracts the billing amount and the unit time corresponding to the telephone number of the current job from the specific telephone number table (step S703). Then the MFP 100 assigns the extracted billing amount and unit time to m and JT, respectively (step S704).

If the satisfactory result is not obtained, that is, if the telephone number of the current job is not listed in the specific telephone number table (No in step S702), the MFP 100 further searches the area code table for an area code of the telephone number of the job (step S705).

Then the MFP 100 judges whether a satisfactory search result is obtained or not (step S706). If satisfactory result is obtained, that is, if the area code of the current job is included in the area code table (YES in step S706), the MFP 100 extracts the billing amount and the unit time corresponding to the area code of the current job from the area code table (step S707). Then the MFP 100 assigns the extracted billing amount and unit time to m and JT, respectively (step S704).

If the satisfactory search result is not obtained, that is, if the telephone number or the area code of the current job is not included in any of the tables (NO in step S706), the MFP 100 assigns 0 to the billing amount m (step S708).

As described in the embodiment 2 above, the MFP 100 stores therein the area code table and the specific telephone number table to be referred to when sending a fax. With this structure, it is possible to reduce the size of the memory included in the MFP 100, and to save time to download the billing amount tables from the billing apparatus 200, comparing to the case in which the billing amount table lists a large number of the specific telephone numbers and the billing amounts in one-to-one correspondence.

Also, since the MFP 100 stores therein the area code table, the billing amount can be determined based on the area code table, even if the specific telephone number of the job to be executed is not listed in the specific telephone number table.

Furthermore, the billing amount can be efficiently determined by referring to the specific telephone number table first, and then to the area code table.

(Modifications)

Up to now, the image forming apparatus pertaining to the present invention is described based on the embodiments. However, it is obvious that the present invention is not limited to the above embodiments.

(1) In the embodiments above, it is described that the MFP 100 receives the billing amount tables every time the start key is pressed. However, the MFP 100 may receive the billing amount tables on a regular basis or an irregular basis, or may receive the billing amount tables only when the power is turned ON.

(2) In the embodiments above, it is described that the MFP 100 receives the billing amount tables and the upper limit every time the start key is pressed. However, the MFP 100 may receive only the upper limit if the billing amount tables are commonly used among the users and the departments.

(3) In the embodiment 1 above, it is described that if the applicable billing amount is not extracted from any of the size table and the range table, the MFP 100 transmits the table error message to the billing apparatus 200. However, a billing amount corresponding to a size most approximate to the currently-processed sheet may be extracted from the size table. With this structure, even if the size of the currently-processed sheet is not included in any length ranges of the range table, the billing amount of the most approximate size to the currently-processed sheet is extracted as being equivalent to the applicable billing amount. Accordingly, the proper billing is performed.

(4) In the embodiments above, it is described that the sheet size and the telephone number are used as a parameter relating to the execution of jobs. However, the parameter is not limited to be the sheet size or the telephone number. Other parameter may be applied if the parameter is related to a job and the billing amount for the job is determined by the parameter values given to the parameter.

The present invention may be any combination of the above embodiments and modifications.

Also, obviously it is possible to apply various changes or modifications to the image forming apparatus of the present invention in accordance with the effect of the present invention and without departing from the scope thereof.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus that executes a job and determines a billing amount for the job depending on a parameter value given to a parameter that relates to the execution of the job, the image forming apparatus comprising:
    a storage that stores therein a first table and a second table, the first table recites a plurality of non-overlapping value ranges and lists a billing amount for an individual item falling within each of the non-overlapping value ranges, the second table recites a plurality of specific values and lists a billing amount for an individual item having one of the specific values and at least one of the plurality of specific values being included in any of the plurality of value ranges; and
    a processor operable to refer to the second table and judge whether the parameter value given to the parameter is identical to any one of the plurality of specific values in the second table, and if identical, determine the billing amount for the job according to the second table, without judging whether the parameter value is included in any of the plurality of value ranges in the first table, and if the parameter value is not identical to any one of the plurality of specific values in the second table, the determiner further refers to the first table and judges whether the parameter value is included in any of the plurality of value ranges in the first table, and if included, determine a billing amount for the job according to the first table.

2. The image forming apparatus of claim 1, wherein if the parameter value is not included in any of the plurality of value ranges in the first table, the processor determines the billing amount for the job to be a billing amount corresponding to one of the plurality of specific values in the second table that is nearest to the parameter value.

3. The image forming apparatus of claim 1, wherein if the parameter value is not included in any of the plurality of value ranges in the first table, the processor judges that an error has occurred.

4. The image forming apparatus of claim 1, wherein if the parameter value is not included in any of the plurality of value ranges in the first table, the processor determines the billing amount for the job to be 0.

5. The image forming apparatus of claim 1, wherein the parameter is a sheet size, the first table is a range table that defines billing amounts for a plurality of ranges of a sheet size, and the second table is a size table that defines billing amounts for a plurality of specific sheet sizes.

6. The image forming apparatus of claim 1 that has a facsimile function, wherein
    the parameter is a telephone number, the first table is an area code table that defines billing amounts for a plurality of combinations of area codes and exchange numbers, and the second table is a specific telephone number table that defines billing amounts for a plurality of specific telephone numbers.

7. The image forming apparatus of claim 6, wherein the telephone numbers include IP telephone numbers.

8. A billing amount determination method used in an image forming apparatus that executes a job and determines a billing amount for the job depending on a parameter value given to a parameter that relates to the execution of the job, the billing amount determination method comprising:
    a judging step of, referring to a second table before referring to a first table and using a processor to judge whether the parameter value given to the parameter is identical to any one of a plurality of specific values in a second table, the first table recites a plurality of non-overlapping value ranges and lists a billing amount for an individual item falling within each of the non-overlapping value ranges, the second table recites a plurality of specific values and lists a billing amount for an individual item having one of the specific values, and at least one of the plurality of specific values being included in any of the plurality of value ranges; and
    a determination step of, if the judging step has judged that the parameter value is identical to any one of the plurality of specific values in the second table, determining the billing amount for the job according to the second table, without judgment as to whether the parameter value is included in any of the plurality of value ranges in the first table, and if the parameter value is not identical to any one of the plurality of specific values in the second table, refers to the first table and, using the processor, judges whether the parameter value is included in any of the plurality of value ranges in the first table, and if included, determine a billing amount for the job according to the first table.

9. A billing system that includes an image forming apparatus and a billing apparatus, the image forming apparatus executing a job and determining a billing amount for the job depending on a parameter value given to a parameter that relates to the execution of the job, the image forming apparatus comprising:
    a storage that stores therein a first table and a second table, the first table recites a plurality of non-overlapping value ranges and lists a billing amount for an individual item falling within each of the non-overlapping value ranges, the second table recites a plurality of specific values and lists a billing amount for an individual item having one of the specific values and at least one of the plurality of specific values being included in any of the plurality of value ranges; and
    a processor operable to refer to the second table and judge whether the parameter value given to the parameter is identical to any one of the plurality of specific values in the second table, and if identical, determine the billing amount for the job according to the second table, without judging whether the parameter value is included in any of the plurality of value ranges in the first table, and if the parameter value is not identical to any one of the plurality of specific values in the second table, the processor further refers to the first table and judges whether the parameter value is included in any of the plurality of value ranges in the first table, and if included, determine a billing amount for the lob according to the first table.

* * * * *